United States Patent [19]
Takeuchi

[11] Patent Number: 5,990,860
[45] Date of Patent: *Nov. 23, 1999

[54] APPARATUS FOR VARYING SCALE OF A VIDEO STILL AND MOVING IMAGE SIGNAL WITH KEY DATA BEFORE SUPERIMPOSING IT ONTO A DISPLAY SIGNAL

[75] Inventor: Kesatoshi Takeuchi, Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,483

[22] Filed: Jul. 19, 1996

[30] Foreign Application Priority Data

Jul. 21, 1995 [JP] Japan .................................. 7-207670

[51] Int. Cl.$^6$ .............................. G09G 5/00; H04N 5/445
[52] U.S. Cl. .......................... 345/115; 345/113; 348/564
[58] Field of Search .................................... 345/115, 127, 345/128, 129, 130, 131, 436, 439, 113, 434, 435, 330, 473, 302, 340; 348/581, 584, 5, 592, 565, 7, 564

[56] References Cited

U.S. PATENT DOCUMENTS

| | | | |
|---|---|---|---|
| 4,777,531 | 10/1988 | Hakamada et al. | 348/565 |
| 4,899,292 | 2/1990 | Montagna et al. | 345/127 |
| 5,014,128 | 5/1991 | Chen | 348/564 |
| 5,264,837 | 11/1993 | Buehler | 348/565 |
| 5,327,156 | 7/1994 | Masukane et al. | 345/113 |
| 5,386,505 | 1/1995 | Beattie et al. | 345/343 |
| 5,387,945 | 2/1995 | Takeuchi . | |
| 5,402,174 | 3/1995 | Chen et al. | 345/115 |
| 5,469,221 | 11/1995 | Takeuchi . | |
| 5,500,933 | 3/1996 | Schnorf | 345/434 |
| 5,572,728 | 11/1996 | Tada et al. | 345/336 |
| 5,583,536 | 12/1996 | Cahill, III | 345/343 |
| 5,592,236 | 1/1997 | Rosenbaum et al. | 345/114 |
| 5,634,850 | 6/1997 | Kitahara et al. | 345/115 |
| 5,657,462 | 8/1997 | Brouwer et al. | 395/336 |
| 5,696,527 | 12/1997 | King et al. | 345/113 |
| 5,742,329 | 4/1998 | Masunaga et al. | 348/564 |
| 5,821,947 | 10/1998 | Nguyen | 345/473 |

OTHER PUBLICATIONS

American Heritage Dictionary p. 886 and 1220, 1982.

*Primary Examiner*—Jeffrey Brier
*Assistant Examiner*—Paul A. Bell
*Attorney, Agent, or Firm*—Oblon, Spivak, McClelland, Maier & Neustadt, P.C.

[57] ABSTRACT

A video signal of a still image is written into a still image area SIA in a video memory 310, whereas a video signal of a moving picture is written into a moving picture area MIA in the video memory 310. A video signal is read out from the video memory 310 while scaling up or down the video image, and the scaled video signal is then supplied to a display device. This enables a scaled moving picture and a scaled still image to be displayed on the display device.

4 Claims, 12 Drawing Sheets

VIDEO IMAGE IN A WINDOW ON COLOR CRT 701

VIDEO DATA IN SECOND VRAM 310

VIDEO DATA IN WINDOW MEMORY AREA 632

COLOR KEY DATA KY

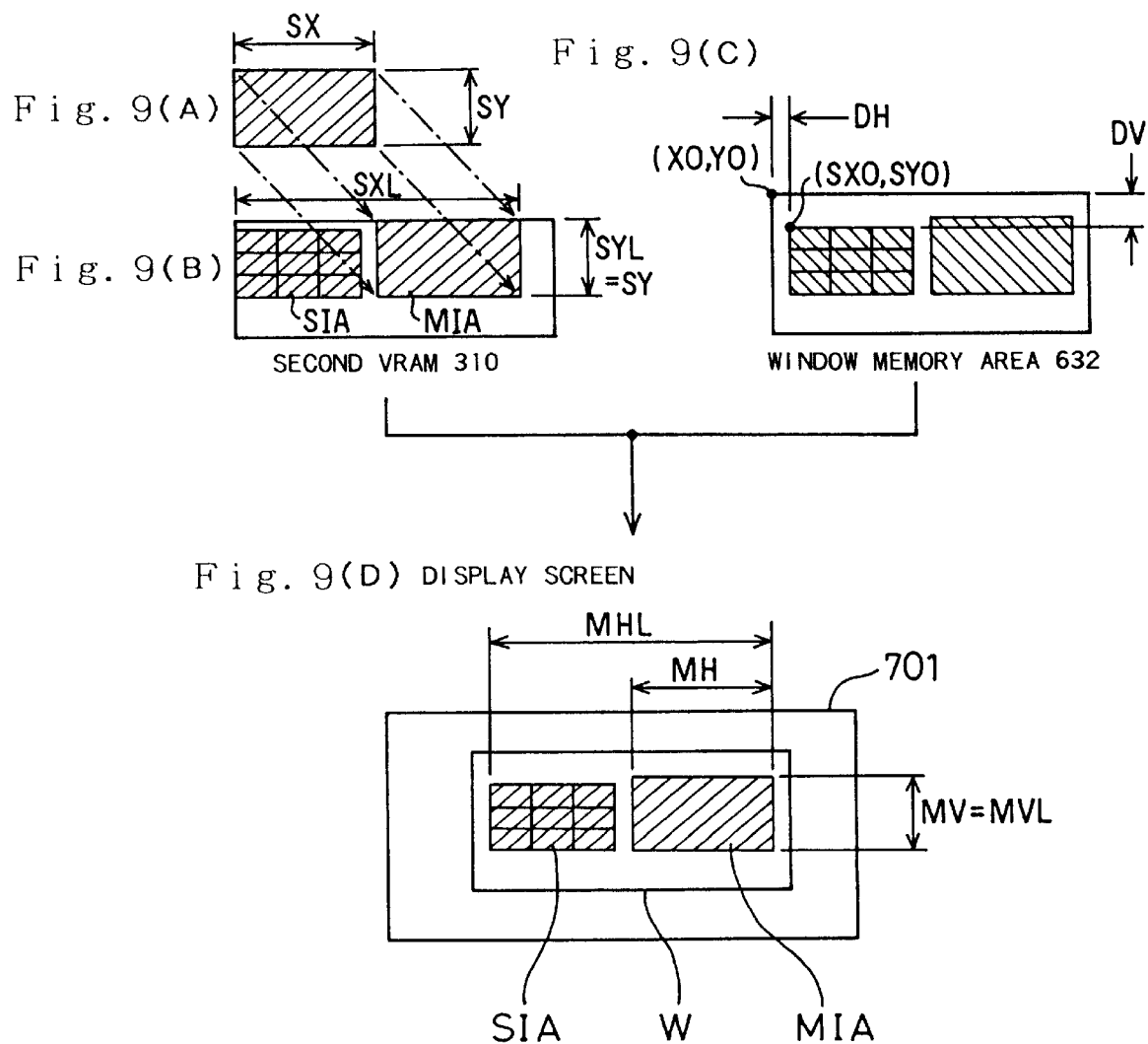

Fig. 10(A) SELECT PERSON TO BE CALLED
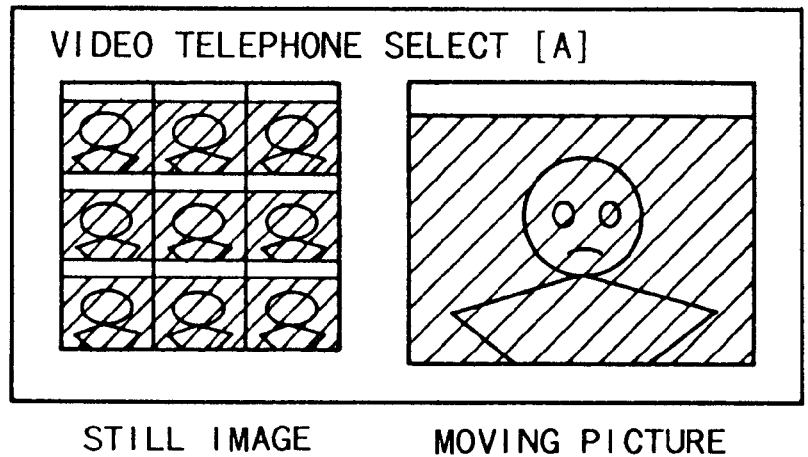
STILL IMAGE     MOVING PICTURE
Fig. 10(B) TALKING OVER THE TELEPHONE
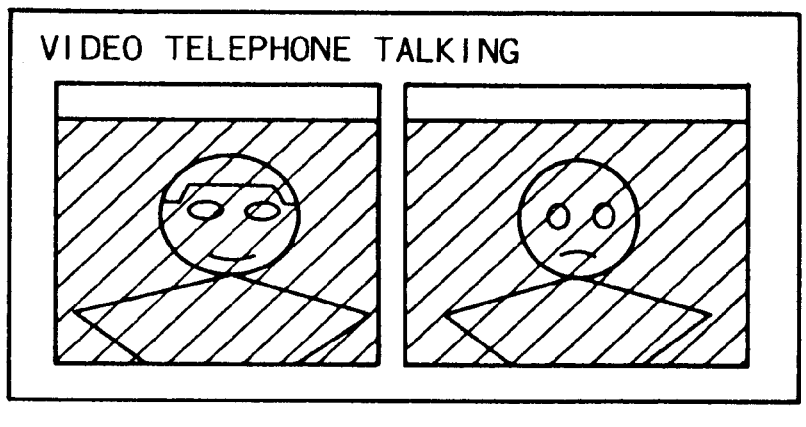
SEMI-CONTINUOUS STILL IMAGE     MOVING PICTURE
(SEMI-MOVING PICTURE)

APPARATUS FOR VARYING SCALE OF A VIDEO STILL AND MOVING IMAGE SIGNAL WITH KEY DATA BEFORE SUPERIMPOSING IT ONTO A DISPLAY SIGNAL

BACKGROUND OF THE INVENTION

1. Field of the Invention

The present invention relates to a method of and an apparatus for displaying a moving picture and a still image simultaneously on a display device of a computer system.

2. Description of the Related Art

FIG. 12 shows a still image and a moving picture, simultaneously displayed in one window on a display device. A conventional procedure for realizing such a display includes the steps of storing a still image and a moving picture into separate video memories and combining the still image with the moving picture on the display by a known overlaying technique.

In multiple windows systems, such as MS-WINDOWS (trade mark of Microsoft Corporation), the size of each window is changeable. The change of the window size will accompany either: extending the range of the video image to be displayed in the window while keeping a magnification of the video image; or scaling the video image while keeping the range of the video image to be displayed.

The conventional overlaying technique is, however, not suitable for simultaneously scaling up or down a still image and a moving picture in changing the window size and displaying the images.

SUMMARY OF THE INVENTION

Accordingly, an object of the present invention is thus to simultaneously scale up or down a still image and a moving picture and display the images.

In order to attain at least part of the above object, the present invention is directed to a method of displaying a moving picture and a still image simultaneously on a display device of a computer system. The method comprises the steps of: (a) writing a still image video signal into a still image area in a video memory; and (b) writing a moving picture video signal into a moving picture area in the video memory, reading out a video signal from the video memory while scaling up or down a video image represented by the video signal, and supplying the scaled video signal to the display device, thereby to display a scaled moving picture and a scaled still image on the display device.

A still image and a moving picture are written into a video memory, and a video signal representing a video image including the still image and the moving picture is read out from the video memory while the video image is scaled. This enables the still image and the moving picture to be scaled up or down simultaneously. The scaled video signal is then supplied to a display device, and the scaled still image and the scaled moving picture are displayed simultaneously on the display device accordingly.

According to another aspect of the present invention, the method comprises the steps of: (a) writing key data representing a superimposing area into a first video memory, the first video memory having a memory space corresponding to display screen of the display device; (b) writing a still image video signal into a still image area in a second video memory; (c) continuously writing a moving picture video signal into a moving picture area in the second video memory, while reading out a first video signal from the second video memory; (d) scaling up or down a video image represented by the first video signal to produce a second video signal; (e) combining the second video signal with the superimposing area of a video image represented by a third video signal read out from the first video memory, thereby to produce a fourth video signal; and (f) supplying the fourth video signal to the display device to display a scaled moving picture and a scaled still image on the display device.

According to this method, a still image and a moving picture are written into a second video memory, and a video signal representing a video image including the still image and the moving picture is read out from the second video memory while the video image is scaled. Accordingly, a second video signal representing a video image including the still image and the moving picture is simultaneously scaled up or down. The second video signal thus obtained is combined with a superimposing area of a video image represented by a third video signal read out from a first video memory. This method enables the still image and the moving picture to be imposed in the superimposing area on a display device while being scaled up or down simultaneously.

In a preferred embodiment, the method further comprises the step of: (g) varying a magnification of the scaling in the step (d) and changing the key data stored in the first video memory to scale up or down the superimposing area by the varied magnification.

Even when the magnification of scaling the still image and the moving picture is varied, the above feature scales up or down the superimposing area by the same magnification. The display range of the still image and the moving picture is accordingly kept the same as that prior to the scaling operation.

The present invention is also directed to an apparatus for displaying a moving picture and a still image simultaneously on a display device of a computer system. The apparatus comprises: a video memory; still image writing means for writing a still image video signal into a still image area in a video memory; and scaling means for writing a moving picture video signal into a moving picture area in the video memory, reading out a video signal from the video memory while scaling up or down a video image represented by the video signal, and supplying the scaled video signal to the display device, thereby to display a scaled moving picture and a scaled still image on the display device.

According to an aspect of the present invention, the apparatus comprises: a first video memory having a memory space corresponding to a display screen of the display device; a second video memory; key data writing means for writing key data representing a superimposing area into the first video memory; still image writing means for writing a still image video signal into a still image area in the second video memory; reading means for reading out a first video signal from the second video memory while continuously writing a moving picture video signal into a moving picture area in the second video memory; scaling means for scaling up or down a video image represented by the first video signal, thereby to produce a second video signal; combining means for combining the second video signal with the superimposing area of a video image represented by a third video signal read out from the first video memory, thereby to produce a fourth video signal; and means for supplying the fourth video signal to the display device to display a scaled moving picture and a scaled still image on the display device.

In a preferred embodiment, the apparatus further comprises: means for varying a magnification of the scaling in the scaling means and changing the key data stored in the first video memory to scale up or down the superimposing area by the varied magnification.

These and other objects, features, aspects, and advantages of the present invention will become more apparent from the following detailed description of the preferred embodiments with the accompanying drawings.

BRIEF DESCRIPTION OF THE DRAWINGS

FIGS. 9(A) through 9(D) show the position and the size of video images in the first embodiment;

FIGS. 10(A) and 10(B) show a procedure of the processing in a second embodiment according to the present invention;

DESCRIPTION OF THE EMBODIMENTS

A. General Structure of Apparatus

Figure 1:
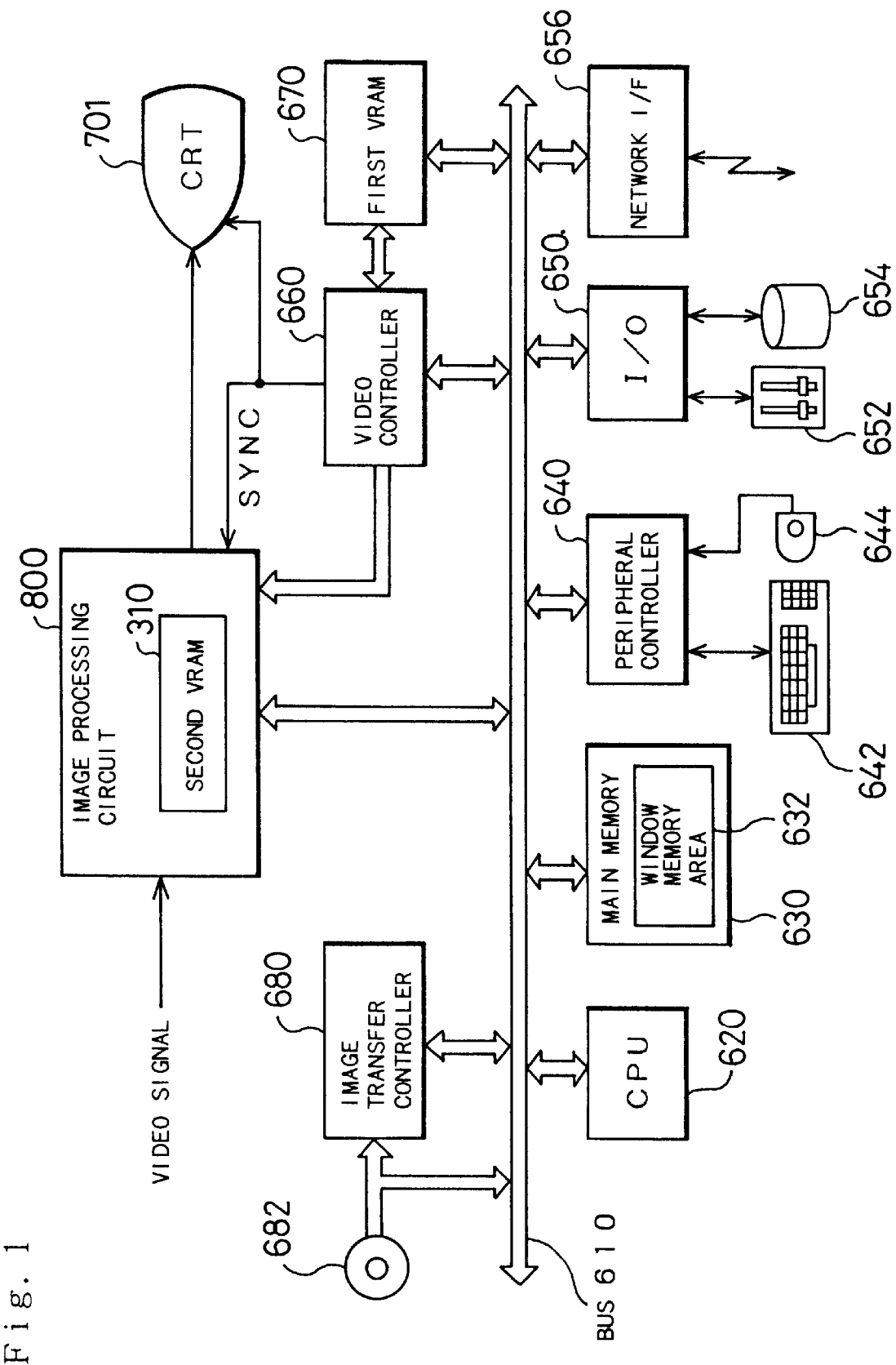
FIG. 1 is a block diagram illustrating the structure of a computer system embodying the present invention.

The following describes a preferred embodiment of the present invention. FIG. 1 is a block diagram illustrating the structure of a computer system embodying the present invention. The computer system comprises a CPU 620, a main memory 630, a peripheral controller 640, a complex I/O port 650, a network interface 656, a video controller 660, a first video RAM (VRAM) 670, an image transfer controller 680, and an image processing circuit 800, which are all connected to a bus 610. The image processing circuit 800 has a second video RAM 310 disposed therein. The first VRAM 670 has a memory area, which is one-to-one mapped to a display area of a color CRT 701.

A keyboard 642 and a mouse 644 are connected to the peripheral controller 640, whereas a floppy disk drive 652 and a hard disk drive 654 are connected to the complex I/O port 650.

The video controller 660 is connected to the color CRT 701 (or a color liquid-crystal display) functioning as a display device. The video controller 660 has functions of writing video data of still images into the first VRAM 670 and reading out video signals from the first VRAM 670 to supply the video signals to the image processing circuit 800. The video controller 660 has further functions of generating synchronizing signals SYNC (vertical synchronizing signal VSPC and horizontal synchronizing signal HSPC), and supplying them to the color CRT 701 and the image processing circuit 800.

The image transfer controller 680 is connected to CD-ROM 682 functioning as a device for supplying video data of moving pictures. The image transfer controller 680 works as a processor which transfers video data of moving pictures supplied from the CD-ROM 682 to the second VRAM 310 via the bus 610.

The image processing circuit 800 combines a moving picture video signal with a still image video signal, and supplies the combined video signal representing the combined video image to the color CRT 701. The image processing circuit 800 further has a function of scaling up or down the combined video signals to simultaneously expand or contract the still image and the moving picture.

B. Internal Structure of Image Processing Circuit 800

Figure 2:
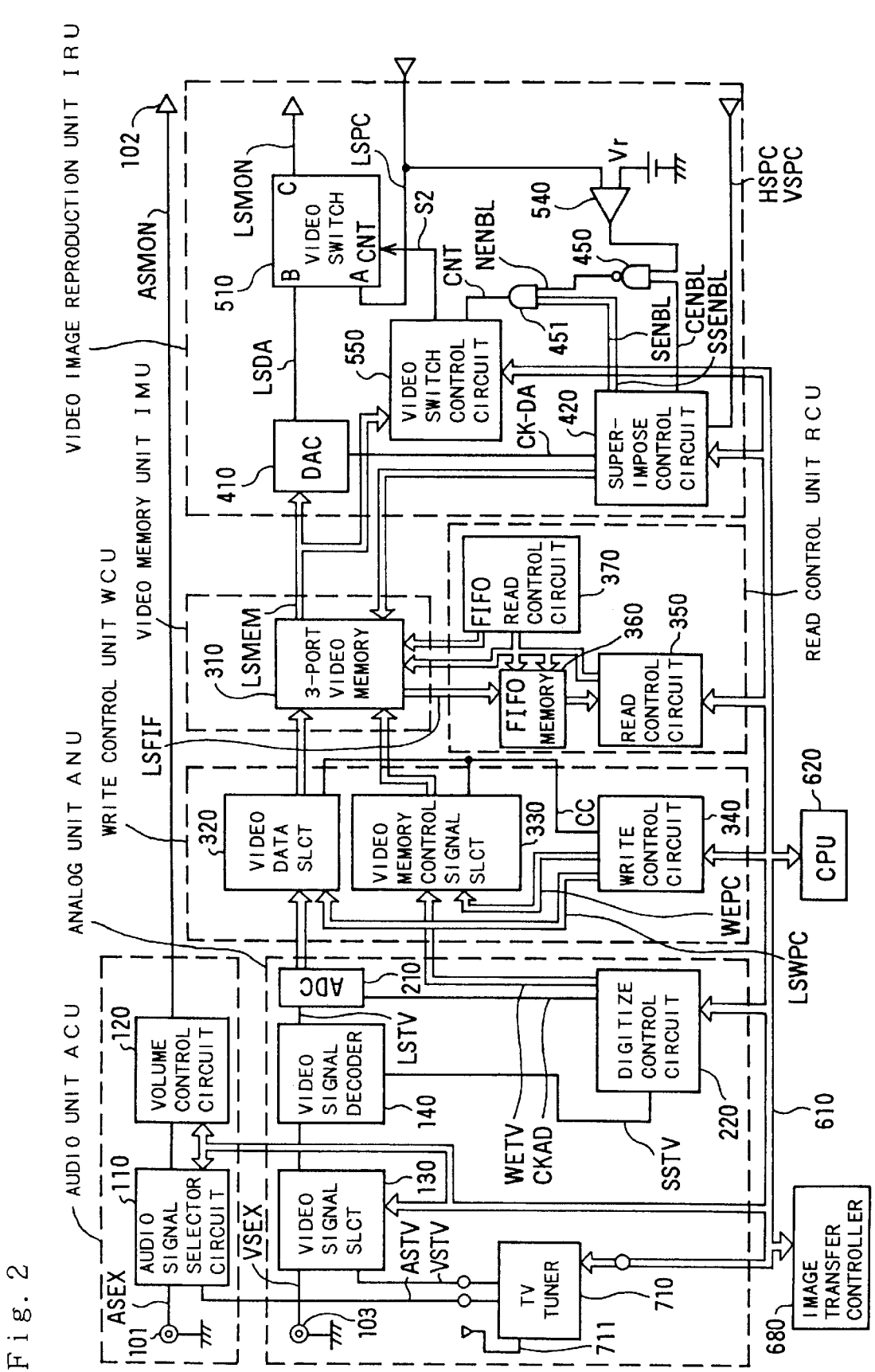
FIG. 2 is a block diagram showing the internal structure of on image processing circuit 800.
Figure 4:
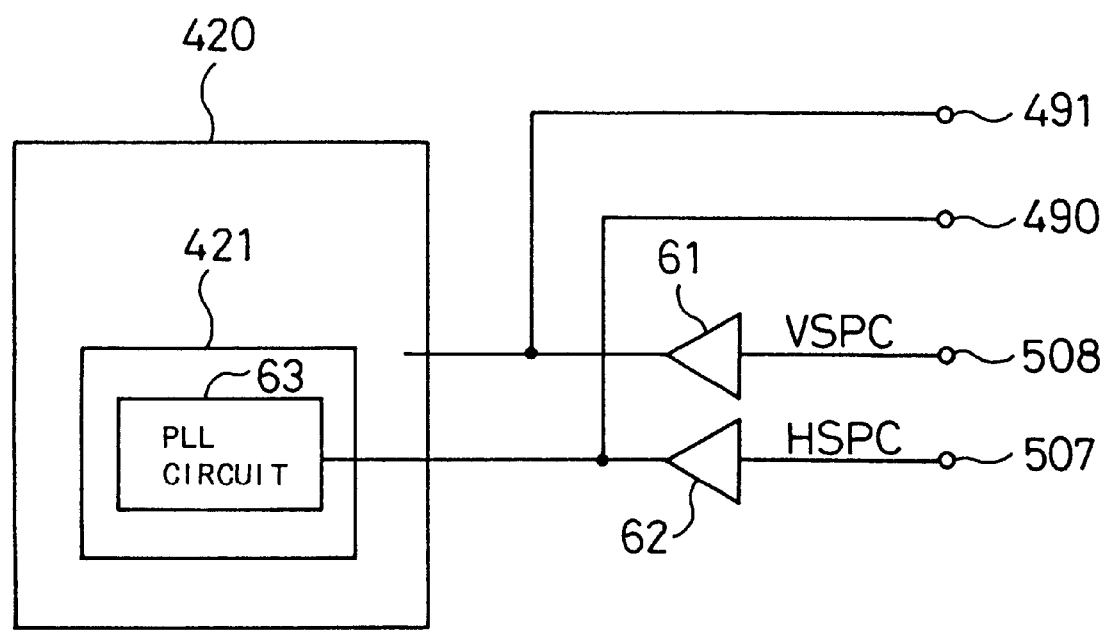
FIG. 4 illustrates an input/output circuit of a horizontal synchronizing signal HSPC and a vertical synchronizing signal VSPC in the superimpose control circuit 420.

FIG. 2 is a block diagram illustrating the internal structure of the image processing circuit 800. The structure of the image processing circuit 800 is shown in FIG. 4 of the commonly-owned U.S. Pat. No. 5,387,945, the disclosure of which is incorporated herein by reference.

The image processing circuit 800 includes an audio unit ACU for processing audio signals, an analog unit ANU for processing analog video signals, such as TV signals, a video memory unit IMU, a write control unit WCU for controlling a process of writing video data into the video memory unit IMU, a read control unit RCU for reading out the video data stored in the video memory unit IMU, and a video image reproduction unit IRU for reproducing video images.

The audio unit ACU comprises an audio input terminal 101, an audio signal selector circuit 110, a volume control circuit 120, and an audio output terminal 102. The audio input terminal 101 receives an audio signal ASEX supplied from a device for supplying moving picture signals, such as a video cassette recorder. The audio signal selector circuit 110 selects either one of the audio signal ASEX and another audio signal ASTV output from a TV tuner 710 of the analog unit ANU, and outputs the selected audio signal. Channel tuning is performed in the TV tuner 710 according to an instruction given by the CPU 620. The volume control circuit 120 controls the volume of the selected audio signal, and the audio output terminal 102 eventually generates the volume-controlled audio signal as an audio signal ASMON, which is supplied to an audio input terminal of the color CRT 701 or a speaker.

The analog unit ANU includes the TV tuner 710, a TV antenna 711, a video input terminal 103, a video signal selector circuit 130, a video signal decoder 140, an A-D converter 210, and a digitize control circuit 220. The video input terminal 103 receives a video signal VSEX supplied from the device for supplying moving picture signals. The video signal selector circuit 130 selects either one of the video signal VSEX and another video signal VSTV output from the TV tuner 710, which has been subject to the channel tuning instructed by the CPU 620, and outputs the selected video signal. The video signal decoder 140 separates the selected video signal into a video signal LSTV and a synchronizing signal SSTV. The video signal LSTV consists of analog color signals representing three primary colors of R, G, and B. The A-D converter 210 converts the analog video signal LSTV to a digital video signal and supplies the digital video signal to the write control unit WCU. The digitize control circuit 220 controls the A-D converter 210 in response to the synchronizing signal SSTV and further controls the second VRAM 310 via the write control unit WCU.

The write control unit WCU includes a video data selector circuit 320, a video memory control signal selector circuit 330, and a write control circuit 340. The video data selector circuit 320 selects either one of the digital output of the A-D converter 210 converted from the analog video signal LSTV and a video signal LSWPC read out from an external device, such as an external storage device, by the CPU 620, in response to a write selecting signal CC output from the write control circuit 340, and outputs the selected video signal. The video memory control signal selector circuit 330 selects either one of a video memory control signal WETV generated by the digitize control circuit 220 and another video memory control signal WEPC generated by the write control circuit 340, in response to the write selecting signal CC. The write control circuit 340 controls the process of writing a video signal LSWPC supplied from the CPU 620 or from the image transfer controller 680 into the video memory unit IMU.

The read control unit RCU comprises a read control circuit 350, a first in-first out (FIFO) memory 360, and a FIFO read control circuit 370. A video signal LSFIF read out from the video memory unit IMU by the FIFO read control circuit 370 is stored into the FIFO memory 360. The read control circuit 350 reads out the video signal LSFIF stored in the FIFO memory 360. The read control unit RCU is used to output video data stored in the video memory unit IMU to an external device, based on an instruction given by the CPU 620.

The video memory unit IMU comprises the 3-port VRAM 310 having one write port and two read ports. Available devices for the 3-port VRAM 310 are CXK1206 manufactured by SONY CORP. and MB81C1501 manufactured by FUJITSU LTD. Further information regarding the structure and functions of the 3-port VRAM 310 is described in the commonly-owned U.S. Pat. No. 5,387,945, the disclosure of which is incorporated herein by reference. The VRAM 310 is not restricted to the 3-port type but may be any memory that can store video data.

The video regenerative unit IRU has functions of combining a video signal LSPC output from the video controller 660 with another video signal LSMEM output from the VRAM 310 to generate a combined video signal LSMON, and supplying the combined video signal LSMON to the color CRT 701.

Various signals in the video regenerative unit IRU are defined as follows:

LSPC: a video signal output from the video controller 660.

LSMEM: a video signal read out from the VRAM 310.

LSDA: an analog video signal generated by digital-to-analog conversion.

LSMON: a combined video signal representing a video image to be displayed on the color CRT 701.

CNT: a switching signal for switching a video switch 510, which selects the video signal LSDA if the switching signal CNT has an High-level and selects the video signal LSPC if the switching signal CNT has a Low-level.

SENBL: a first enable signal for indicating execution or non-execution of superimposing. The first enable signal SENBL is switched to High-level when the operator instructs to select a superimposing mode with the keyboard 642 or the mouse 644, and switched to Low-level when the operator instructs to select a non-superimposing mode.

SSENBL: a second enable signal for specifying a timing corresponding to a superimposing area on the screen. The second enable signal SSENBL has High-level within the superimposing area and Low-level outside of the superimposing area, which is specified by the operator on the screen of the color CRT 701.

NENBL: a third enable signal for specifying execution or non-execution of multiple superimposing. The third enable signal NENBL determines whether the video signal LSPC is to be further superimposed upon part of the video signal LSDA, on which the video signal LSPC has already been superimposed.

COMP: a comparison signal representing an area of multiple superimposing. The level of the comparison signal COMP is determined by comparing the video signal LSPC with a predetermined reference voltage Vr: the comparison signal COMP has High-level in the area where the video signal LSPC is to be superimposed upon part of the video signal LSDA. The comparison signal COMP is effective when an enable signal CENBL discussed below has High-level, thereby to function as the third enable signal NENBL discussed above.

CENBL: an enable signal for specifying execution or non-execution of multiple superimposing. The operator switches the level of the enable signal CENBL.

A D-A converter 410 in the video regenerative unit IRU converts the digital video signal LSMEM read out from the VRAM 310 to the analog video signal LSDA, and supplies the analog video signal LSDA to the video switch 510. The video switch 510 selects one of the video signal LSPC output from the video controller 660 and the video signal LSDA output from the D-A converter 410, and supplies the selected video signal as the combined video signal LSMON to the color CRT 701. The video switch 510 performs the selection in response to the switching signal CNT output from an AND circuit 451.

The superimpose control circuit 420 reads out a video signal stored in the VRAM 310 of the image processing circuit 800 and scales up or down a video image represented by the video signal.

C. Detailed Structure and Operation of Superimpose Control Circuit 420

Figure 3:
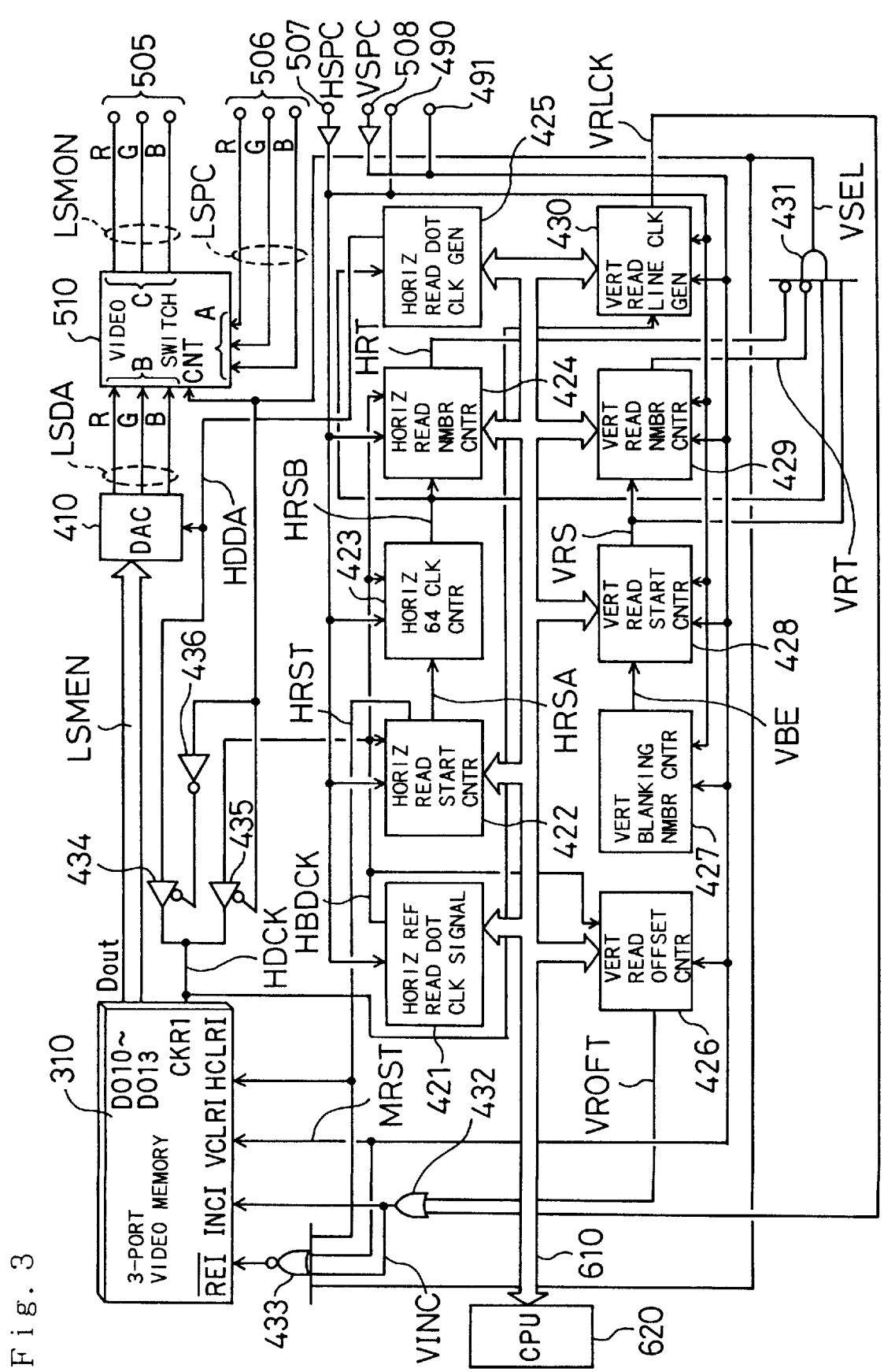
FIG. 3 is a block diagram showing a superimpose control circuit 420 and its peripheral circuits.

FIG. 3 is a block diagram showing the superimpose control circuit 420 and its peripheral circuits. One read port is used here among the three input and output ports in the 3-port VRAM 310. Timing charts relating to the read port are shown in pages 27 to 31 of Data Sheet Number 71215-ST of CXK1206 manufactured by SONY CORP. The read port used here is Read Port 1 specified in page 2 of the above Data Sheet.

In the 3-port VRAM 310, a Port-1 shift signal terminal CKR1 receives a memory driving clock signal HDCK; a Port-1 vertical clear signal terminal VCLR1 receives a memory vertical/horizontal reset signal MRST; a PORT-1 horizontal clear signal terminal HCLR1 receives a horizontal reset signal HRST; a Port-1 line increment signal terminal INC1 receives either a vertical read offset signal VROFT or a vertical read line clock signal VRLCK; and a Port-1 output enable signal terminal RE1 (negative-true logic) receives a Port-1 output enable signal RE1 (negative-true logic). The analog RGB signals LSMEM (one of R, G, and B) are read out from Port-1 data outputs DO10 through DO13.

A Port-1 shift signal CKR1, a Port-1 vertical clear signal VCLR1, a Port-1 horizontal clear signal HCLR1, a Port-1 line increment signal INC1, and a Port-1 output enable signal RE1 (negative-true logic), which respectively correspond to the above terminals, control the process of reading out the analog RGB signals LSMEM. By way of example, the analog RGB signals LSMEM are output as the respective 4-bit data of R, G, and B from the Port-1 data outputs DO10–DO13.

The video switch 510 outputs one of an A terminal input and a B terminal input from a common terminal C, in response to a switching signal VSEL input into a switching signal input terminal CNT. Actually, the video switch 510 outputs from the C terminal the B-terminal input when the switching signal VSEL has High-level, and outputs the A-terminal input when the switching signal VSEL has Low-level. The CPU 620 controls the respective elements via the bus 610 in the computer system.

Referring to FIG. 3, the superimpose control circuit 420 comprises a horizontal reference read-dot clock generator 421 for generating a horizontal reference read-dot clock signal HBDCK, a horizontal read start counter 422 for outputting a horizontal read start signal HRSA and a horizontal read reset signal HRST, a horizontal 64-clock counter 423 for outputting a horizontal read reference signal HRSB, a horizontal read number counter 424 for generating a horizontal read number signal HRT, and a horizontal read-dot clock generator 425 for generating a horizontal read-dot clock signal HDDA. A vertical read offset counter 426 generates the vertical read offset signal VROFT, which specifies offset lines among the read lines of the 3-port VRAM 310 in the vertical direction, on the basis of a count synchronized with the horizontal reference read-dot clock generator 421. A vertical blanking number counter 427 outputs a vertical blanking end signal VBE; a vertical read start counter 428 outputs a vertical read start signal VRS; a vertical read number counter 429 outputs a vertical read number signal VRT; and a vertical read line clock generator 430 generates the vertical read line clock signal VRLCK. AND circuit 431 generates the switching signal VSEL in order to superimpose the two video signals LSPC and LSDA one upon the other. OR circuit 432 outputs either the vertical read offset signal VROFT or the vertical read line clock signal VRLCK as the Port-1 line increment signal INC1. NOR circuit 433 outputs the read enable signal RE1. The superimpose control circuit 420 further includes tri-state circuits 434 and 435 and an inverter circuit 436.

The A terminal of the video switch 510 receives the color video signals LSPC transmitted from a color signal input terminal 506. The horizontal synchronizing signal HSPC output from a synchronizing terminal 507, which corresponds to a horizontal synchronizing component of the input terminal 506, is supplied to: the horizontal reference read-dot clock generator 421, the horizontal read start counter 422, the horizontal 64-clock counter 423, the horizontal read number counter 424, the vertical blanking number counter 427, the vertical read start counter 428, the vertical read number counter 429, and the vertical read line clock generator 430. The vertical synchronizing signal VSPC output from a synchronizing terminal 508, which corresponds to a vertical synchronizing component of the input terminal 506, is supplied to: the 3-port VRAM 310, the vertical read offset counter 426, the vertical blanking number counter 427, the vertical read start counter 428, the vertical read number counter 429, and the vertical read line clock generator 430. The synchronizing signals HSPC and VSPC are also transmitted to synchronizing signal terminals 490 and 491, respectively.

The following describes the input and output of the horizontal synchronizing signal HSPC and the vertical synchronizing signal VSPC, based on the drawing of FIG. 4. The horizontal synchronizing signal HSPC and the vertical synchronizing signal VSPC are supplied to the synchronizing signal terminals 490 and 491 as well as the above-mentioned elements in the superimpose control circuit 420 shown in FIG. 3 via buffers 62 and 61. The buffers 61 and 62 have functions of impedance conversion and wave-form shaping to attain reliable transmission of the synchronizing signals even when an image processing apparatus is connected in series. A PLL (phase-locked loop) circuit 63 included in the horizontal reference read-dot clock generator 421 receives the horizontal synchronizing signal HSPC and generates the horizontal reference read-dot clock signal HBDCK, which defines the horizontal resolution of the whole horizontal screen range specified by the CPU 620.

Figure 5:
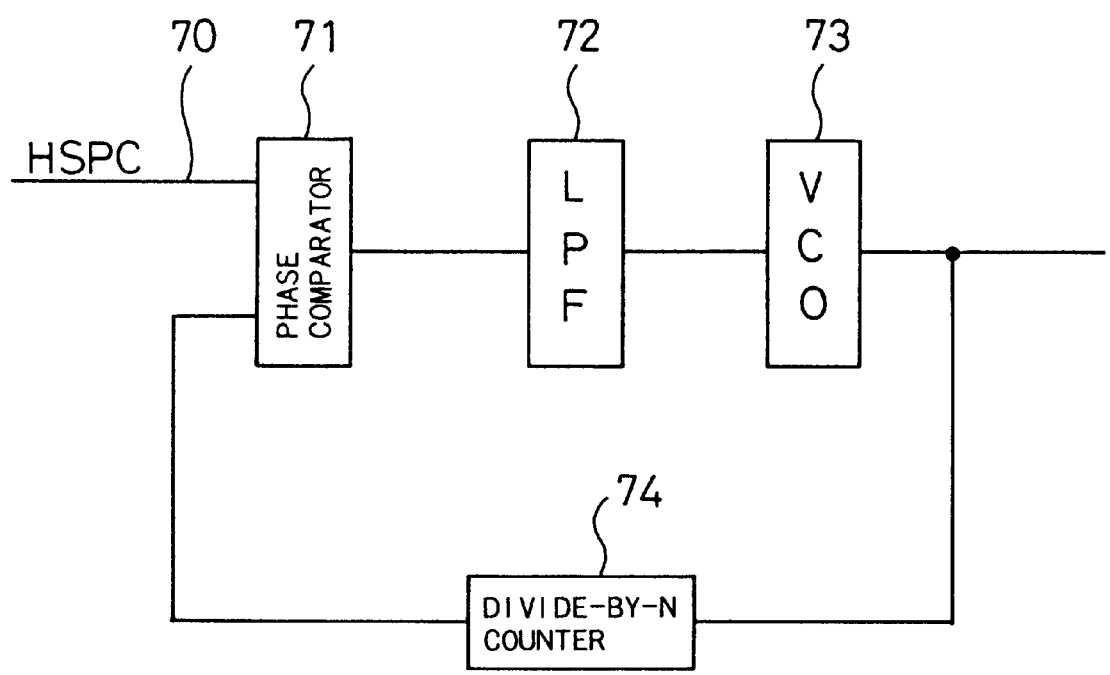
FIG. 5 is a block diagram showing the structure of a PLL circuit 63.

The structure of the PLL circuit 63 is shown in FIG. 5. A phase comparator 71 receives the horizontal synchronizing signal HSPC from a signal line 70 and an output of an divide-by-N counter 74, compares the respective phases of these input signals, and outputs a signal having a pulse width corresponding to the phase difference. The output of the phase comparator 71 is given to the low-pass filter 72 and smoothed before being supplied to a voltage-controlled oscillator (VCO) 73. The VCO 73 oscillates at a frequency corresponding to the given voltage, and transmits the oscillation as the horizontal reference read-dot clock signal HBDCK to the various elements as well as the divide-by-N counter 74. The divide-by-N counter 74 demultiplies the frequency of the horizontal reference read-dot clock signal HBDCK to the frequency of the horizontal synchronizing signal HSPC, and returns the frequency-divided signal to the phase comparator 71. This process generates the horizontal reference read-dot clock signal HBDCK synchronized with the horizontal synchronizing signal HSPC.

The counts in the horizontal read start counter 424, the horizontal 64-clock counter 423, and the horizontal read number counter 424 included in the superimpose control circuit 420 shown in FIG. 3 are reset to zero by the horizontal synchronizing signal HSPC. As discussed previously, the vertical synchronizing signal VSPC output from the synchronizing terminal 508 is given to: the Port-1 vertical clear signal terminal VCLR1 of the 3-port VRAM 310, the NOR circuit 433, the vertical read offset counter 426, the vertical blanking number counter 427, the vertical read start counter 428, the vertical read number counter 429, the vertical read line clock generator 430, and the synchronizing signal terminal 491. The counts in the vertical read offset counter 426, the vertical blanking number counter 427, the vertical read start counter 428, and the vertical read number counter 429 are reset to zero by the vertical synchronizing signal VSPC.

The horizontal reference read-dot clock signal HBDCK lo generated by the horizontal reference read-dot clock generator 421 is supplied to: the horizontal read start counter 422, the horizontal 64-clock counter 423, the horizontal read number counter 424, and the vertical read offset counter 426, and it is further transmitted as the clock signal HDCK for the 3-port VRAM 310 to the Port-1 shift signal terminal CKR1 of the 3-port VRAM 310 via the tri-state circuit 435.

The horizontal read-dot clock generator 425 includes a PLL circuit, which outputs a signal having a frequency which is N1 times the frequency of the horizontal synchronizing signal HSPC. The horizontal read-dot clock generator 425 receives as a reference the horizontal read reference signal HRSB from the horizontal 64-clock counter 423 and outputs the horizontal read-dot clock signal HDDA. The horizontal read-dot clock signal HDDA generated by the horizontal read-dot clock generator 425 is given as the clock signal HDCK for the 3-port VRAM 310 to the Port-1 shift signal terminal CKR1 of the 3-port VRAM 310 via the tri-state circuit 434, and is also supplied to the D-A converter 410. The horizontal read-dot clock signal HDDA is used as a read clock signal of the digital RGB signal LSMEM and as a conversion clock signal of the D-A converter 410.

Figure 6A:
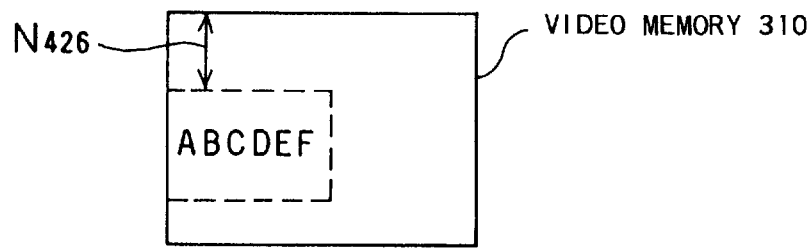
FIGS. 6(A) through 6(C) show functions of preset values of the respective elements in the superimpose control circuit 420.
Figure 6B:
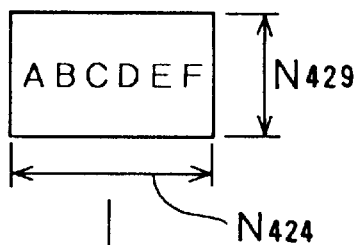
Figure 6C:
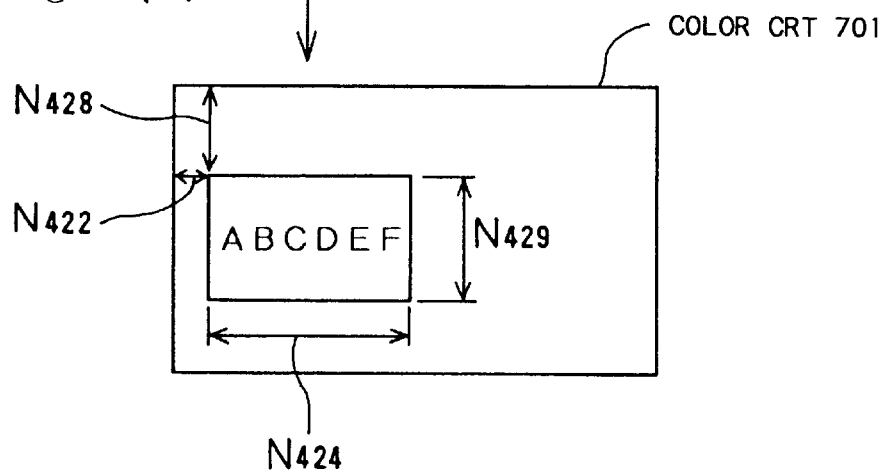

FIGS. 6(A) through 6(C) show functions of setting values of the respective elements in the superimpose control circuit 420. A ratio ($f_{HBDCK}/f_{HDDA}$) of a frequency $f_{HBDCK}$ of the horizontal reference read-dot clock signal HBDCK to a frequency $F_{HDDA}$ of the horizontal read-dot clock signal HDDA is equal to a horizontal magnification KH of a video image displayed on the color CRT 701 (FIG. 6(B)) from a video image read out from the 3-port VRAM 310 (FIG. 6(A)). The video image displayed on the color CRT 701 can accordingly be expanded or contracted in the horizontal direction by varying the frequency $F_{HDDA}$ of the horizontal read-dot clock signal HDDA. In other words, the video image can be scaled up or down in the horizontal direction by adjusting a frequency dividing value N425 of the PLL circuit included in the horizontal read-dot clock generator 425.

The vertical read line clock generator 430 includes a PLL circuit for outputting a signal having a frequency which is N2 times the frequency of the vertical synchronizing signal VSPC. The vertical read line clock generator 430 is synchronized with the vertical synchronizing signal VSPC and generates the vertical read line clock signal VRLCK. The vertical read line clock signal VRLCK is supplied from the vertical read line clock generator 430 via the OR circuit 432 to the Port-1 line increment signal terminal INC1 of the 3-port VRAM 310, which increments the line address of the 3-port VRAM 310 in the vertical direction. The signal VRCLK is also transmitted to the Port-1 output enable signal terminal RE1 (negative-true logic) via the OR circuit 432 and the NOR circuit 433.

Referring to FIG. 6(A), a ratio ($f_{HSYNC}/f_{VRLCK}$) of a frequency $f_{HSYNC}$ of the horizontal synchronizing signal HSPC to a frequency $f_{VRLCK}$ of the vertical read line clock signal VRLCK is identical with a vertical magnification KV of the video image displayed on the color CRT 701 (FIG. 6(B)) from the video image read out from the 3-port VRAM 310 (FIG. 6(A)). The video image displayed on the color CRT 701 can accordingly be expanded or contracted in the vertical direction by varying the frequency $f_{VRLCK}$ of the vertical read line clock signal VRLCK. In other words, the video image can be scaled up or down in the vertical direction by adjusting a frequency dividing value N430 of the PLL circuit included in the vertical read line clock generator 430.

The superimpose control circuit 420 obtains the read timings from the horizontal reference read-dot clock signal HBDCK, the horizontal read-dot clock signal HDDA, and the vertical read line clock signal VRLCK.

The vertical read offset counter 426 is used to determine the start offset line position of the read lines in the 3-port VRAM 310. For this purpose, the vertical read offset counter 426 supplies the vertical read offset signal VROFT, which increments the line address of the 3-port VRAM 310 in the vertical direction, to the OR circuit 432, after the count in the vertical read offset counter 426 is reset to zero by the vertical synchronizing signal VSPC. The transmission of the vertical read offset signal VROFT is synchronized with the horizontal reference read-dot clock signal HBDCK output from the horizontal reference read-dot clock generator 421.

Referring to FIG. 6(A), a preset value N426 in the vertical read offset counter 426 indicates the starting position in the vertical direction of a video image area (the area defined by the broken line) read out from the 3-port VRAM 310.

The vertical blanking number counter 427 includes a counter (not shown) for deleting a vertical back porch of the video signal LSPC. The counter counts the number of clocks in the horizontal synchronizing signal HSPC, and outputs the vertical blanking end signal VBE to the vertical read start counter 428 after the vertical back porch is reached.

The vertical read start counter 428 receives the enable signal (or vertical blanking end signal VBE) output from the vertical blanking number counter 427, counts the number of clocks of the horizontal synchronizing signal HSPC, and supplies the read start enable signal (or vertical read start signal) VRS to the vertical read number counter 429. The vertical read start signal VRS represents a start timing of reading from the 3-port VRAM 310 in the vertical direction.

Referring to FIG. 6(C), a preset value N428 in the vertical read start counter 428 defines the display start position in the vertical direction, when the video image read out from the 3-port VRAM 310 is displayed on the screen of the color CRT 701.

The vertical read number counter 429 receives the read start enable signal (or vertical read start signal) VRS output from the vertical read start counter 428, counts the number of clocks in the horizontal synchronizing signal HSPC, and supplies the vertical read number signal VRT to the AND circuit 431. The vertical read number signal VRT indicates a time period of reading from the 3-port VRAM 310 in the vertical direction.

Referring to FIGS. 6(B) and 6(C), a preset value N429 in the vertical read number counter 429 defines the number of lines in the vertical direction of the video image displayed on the color CRT 701.

As discussed above, the vertical read offset counter 426, the vertical blanking number counter 427, the vertical read start counter 428, the vertical read number counter 429, and the vertical read line clock generator 430 control the process of reading from the 3-port VRAM 310 in the vertical direction.

The CPU 620 in the computer system sets predetermined values to: the number of clocks N426 in the horizontal reference read-dot clock signal HBDCK counted by the vertical read offset counter 426; the number of clocks N427 in the horizontal synchronizing signal HSPC counted by the vertical blanking number counter 427; the number of clocks N428 in the horizontal synchronizing signal HSPC counted by the vertical read start counter 428; the number of clocks N429 in the horizontal synchronizing signal HSPC counted by the vertical read number counter 429; and the value of the divide-by-N counter in the PLL circuit included in the vertical read line clock generator 430.

The horizontal read start counter 422 counts the number of clocks of the horizontal reference read-dot clock signal HBDCK output from the horizontal reference read-dot clock generator 421, and supplies the read start enable signal (or horizontal read start signal) HRSA to the horizontal 64-clock counter 423. The horizontal read start signal HRSA indicates a start timing of reading from the 3-port VRAM 310 in the horizontal direction.

Referring to FIG. 6(C), a preset value N422 in the horizontal read start counter 422 defines the display start position in the horizontal direction, when the video image read out from the 3-port VRAM 310 is displayed on the screen of the color CRT 701.

The horizontal 64-clock counter 423 receives the read start enable signal (or horizontal read start signal) HRSA output from the horizontal read start counter 422, and counts the number of clocks of the horizontal reference read-dot clock signal HBDCK output from the horizontal reference read-dot clock generator 421. When the count reaches 64 clocks representing the time of reading from the 3-port VRAM 310, the horizontal read reference signal HRSB is supplied to the horizontal read dot clock generator 425, the horizontal read number counter 424, and the AND circuit 431.

The horizontal read number counter 424 counts the number of clocks of the horizontal reference read-dot clock signal HBDCK output from the horizontal reference read-dot clock generator 421, and supplies the horizontal read number signal HRT to the AND circuit 431. The horizontal read number signal HRT represents a time period of reading from the 3-port VRAM 310 in the horizontal direction.

Referring to FIGS. 6(B) and 6(C), a preset value N424 in the horizontal read number counter 424 defines the number of dots in the horizontal direction of the video image displayed on the color CRT 701.

As discussed above, the horizontal read start counter 422, the horizontal 64-clock counter 423, and the horizontal read number counter 424 control the process of reading from the 3-port VRAM 310 in the horizontal direction. The CPU 620 in the computer system respectively sets predetermined values to: the value of the frequency divider in the PLL circuit included in the horizontal reference read-dot clock generator 421; the value of the frequency divider in the PLL circuit included in the horizontal read-dot clock generator 425; the number of clocks N422 in the horizontal reference read-dot clock signal HBDCK counted by the horizontal read start counter 422; and the number of clocks N424 in the horizontal reference read-dot clock signal HBDCK counted by the horizontal read number counter 424.

D. Video Image Processing in First Embodiment

Figure 7A:
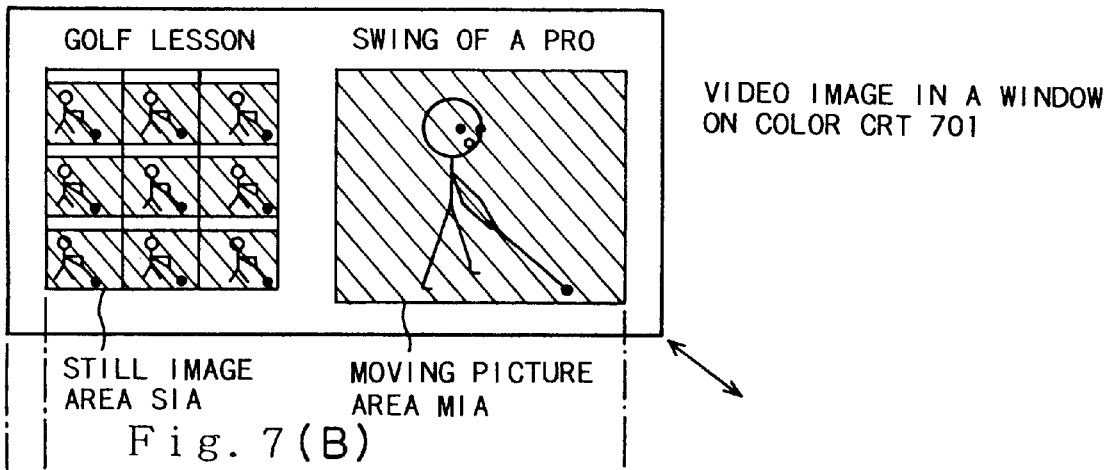
FIGS. 7(A) through 7(C) show a procedure of the processing in the first embodiment of the present invention.
Figure 7B:
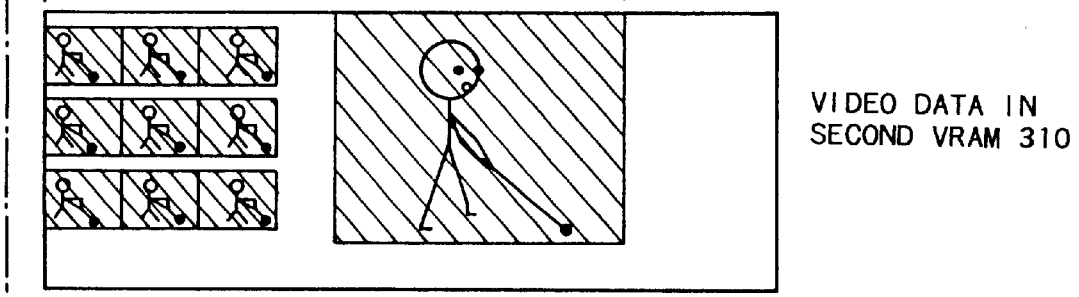
Figure 7C:
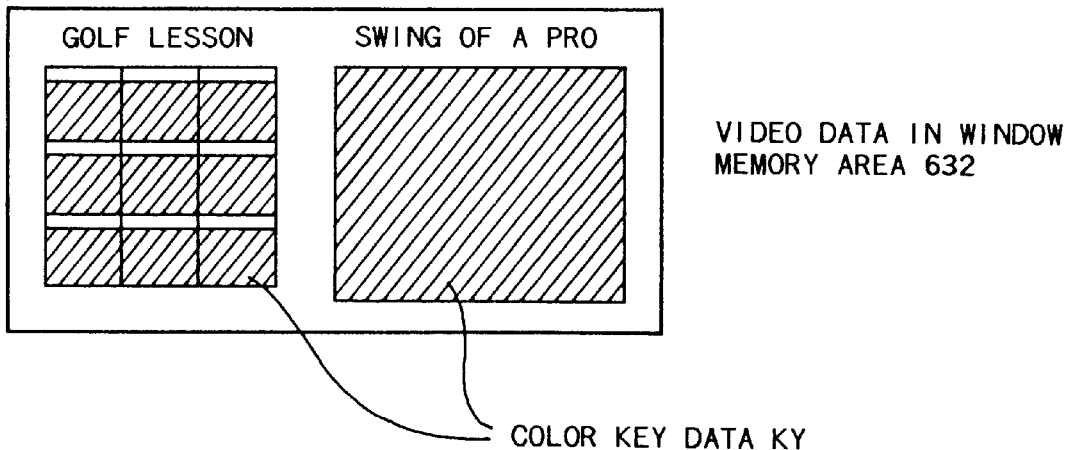
Figure 8:
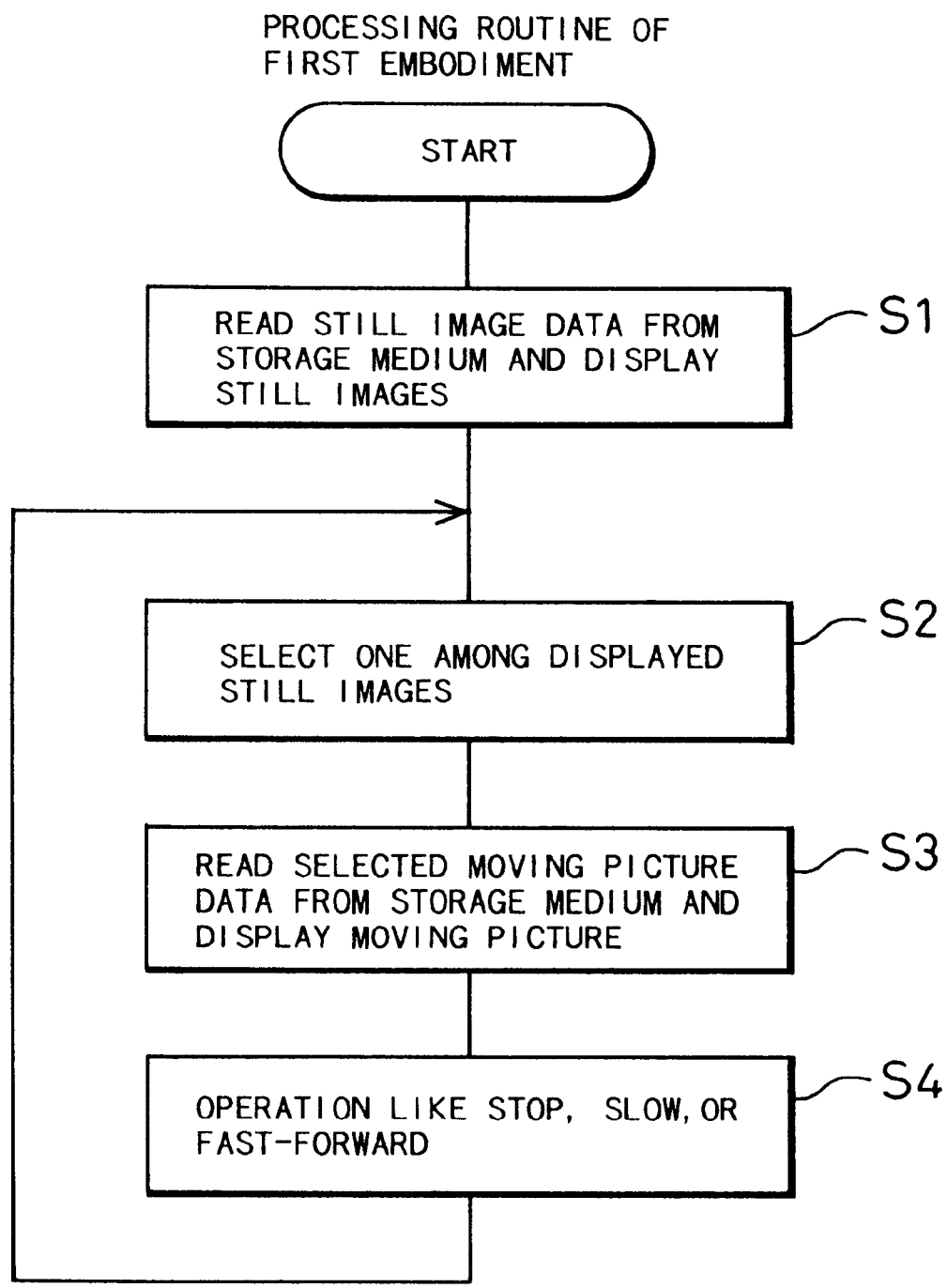
FIG. 8 is a flowchart showing a processing routine executed in the first embodiment of the present invention.

FIGS. 7(A) through 7(C) show a procedure of the processing executed in the first embodiment of the present invention; and FIG. 8 is a flowchart showing its processing routine. The CPU 620 executes an applications program stored in the main memory 630 to implement the processing of FIG. 8.

In the processing of the first embodiment, photographs of nine different professional golf players are displayed as still images in the left half of one window on the color CRT 701 as shown in FIG. 7(A). When the user selects one of the pro golf players with the mouse 644, a moving picture shows a swing of the selected pro golf player in the right half of the window.

At step S1 in the flowchart of FIG. 8, the CPU 620 or the image transfer controller 680 reads out video data of still images from an external storage device, such as the CD-ROM 682, and writes the video data of the still images into a still image area SIA in the second VRAM 310. The video data stored in the second VRAM 310 are subsequently read out by the superimpose control circuit 420 and supplied to the color CRT 701. The still images written in the second VRAM 310 are accordingly displayed on the color CRT 701 at step S1.

The program then proceeds to step S2, at which the user selects one among the nine pro golf players displayed as the still images. At step S3, the image transfer controller 680 reads out video data of a moving picture showing a swing of the selected pro golf player from the CD-ROM 682, and transfers the video data of the moving picture to a moving picture area MIA in the second VRAM 310. As shown in FIG. 7(B), the moving picture showing a swing of the selected pro golf player is accordingly written into the moving picture area MIA in the second VRAM 310.

As shown in FIG. 7(C), a window memory area 632 of the main memory 630 stores a series of characters of "Golf Lesson" and "Swing of A pro", which are to be displayed in the window, and color key data KY representing a superimposing area in which a video image stored in the second VRAM 310 is to be superimposed. The video data in the window memory area 632 are transferred to the first VRAM 670 by the CPU 620. When multiple windows are open on the screen, a plurality of window memory areas are set in the main memory 630. In this case, the CPU 620 transfers video data in the respective window memory areas to the first VRAM 670. The video controller 660 reads out the video data stored in the first VRAM 670 as the video signal LSPC and supplies the video signal LSPC to the image processing circuit 800. The image processing circuit 800 accordingly receives the video signal LSPC including the color key data KY.

The level of the video signal LSPC corresponding to the color key data KY is not lower than the reference voltage Vr shown in FIG. 2. In the areas where the color key data KY is set (that is, the superimposing areas), the comparison signal COMP output from a voltage comparator circuit 540 is switched to Low-level, and the video signal LSDA read out from the second VRAM 310 is selected by the video switch 510 and given to the color CRT 701. In the areas where the color key data KY is not set, on the other hand, the video signal LSPC read out from the first VRAM 670 by the video controller 660 is selected and displayed on the color CRT 701. Namely, video images read out from the second VRAM 310 are displayed in the superimposing areas where the color key data KY is set while those read out from the first VRAM 670 are displayed in the areas where the color key data KY is not set.

FIGS. 9(A) through 9(D) show the position and the size of video images in the first embodiment. FIG. 9(A) shows the size SX [dot] and SY [line] of a moving picture, and FIG. 9(B) illustrates the still image area SIA and the moving picture area MIA in the second VRAM 310. The size of an area including the still image area SIA and the moving picture area MIA is defined by SXL [pixel] and SYL [line]. FIG. 9(C) shows a color key data area (superimposing area) in the window memory area 632. By way of example, it is here assumed that a starting address (offset address) of the window memory area 632 is (X0,Y0) and a starting address of the color key data area of a still image (address at an upper left point) is (SX0,SY0). An address difference (SX0-X0, SY0-Y0) is defined to be (DH,DV). FIG. 9(D) shows a display on the screen of the color CRT 701. The size of the moving picture area MIA in a window W is defined by MH [pixel] and MV [line], and the size of an area including the still image area SIA and the moving picture area MIA is defined by MHL [pixel] and MVL [line].

On the basis of the moving picture in FIG. 9(A), a horizontal display magnification KH and a vertical display magnification KV of a moving picture in FIG. 9(D) are given as:

$$KH=MH/SX \tag{1a}$$

$$KV=MV/SY \tag{1b}$$

The address (SX0,SY0) at a display starting position in the window W is expressed as:

$$SX0=X0+DH \tag{2a}$$

$$SY0=Y0+DV \tag{2b}$$

The display size MHL and MVL of the area including still image area SIA and the moving picture area MIA on the screen of the color CRT 701 is given as:

$$MHL=SXL \times KH \tag{3a}$$

$$MVL=SYL \times KV \tag{3b}$$

As discussed previously with the drawings of FIGS. 6(A) through 6(C), the horizontal display magnification KH of a video image can be varied by adjusting the frequency dividing value N425 of the PLL circuit in the horizontal read dot-clock generator 425 (see FIG. 3). The vertical display magnification KV of a video image can similarly be varied by adjusting the frequency dividing value N430 of the PLL circuit in the vertical read line clock generator 430. Concretely the frequency dividing values N425 and N430 are given as:

$$N425=NH0/KH \quad (4a)$$

$$N430=NV0/KV \quad (4b)$$

wherein NH0 denotes a frequency dividing value when the horizontal display magnification KH is equal to 1, and NV0 denotes a frequency dividing value when the vertical display magnification KV is equal to 1.

In this manner, the first embodiment enables the still image and the moving picture in the window W to be simultaneously scaled up or down by the same magnification by adjusting the frequency dividing values N425 and N430 of the PLL circuits. The horizontal display magnification KH and the vertical display magnification KV may be set to have different values.

When the display magnifications KH and KV are changed, the CPU 620 scales up or down the color key data area in the window memory area 632 according to the new display magnifications KH and KV. Since the amount of data in the window memory area 632 is significantly smaller than that in the VRAM, the CPU 620 can perform the high-speed scaling of the color key data area.

E. Video Image Processing in Second Embodiment

Figure 11:
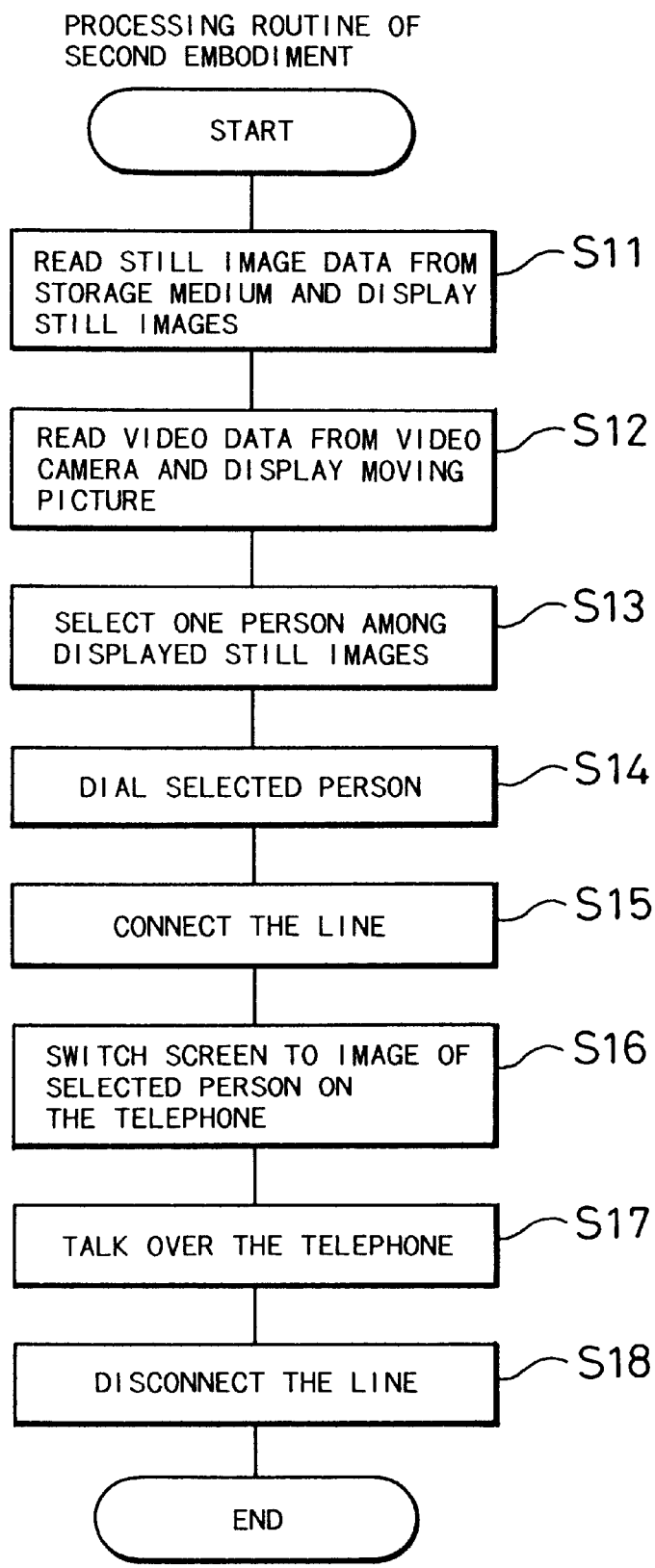
FIG. 11 is a flowchart showing a processing routine executed in the second embodiment of the present invention.
Figure 12:
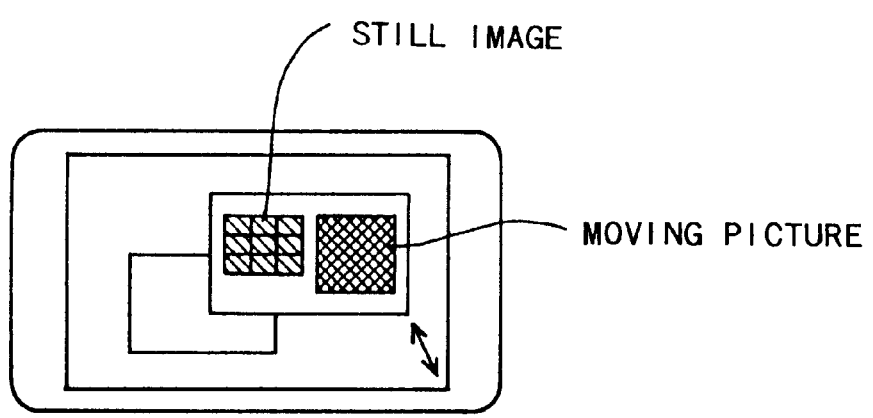
FIG. 12 shows a still image and a moving picture simultaneously displayed in a window on a display device.

FIGS. 10(A) and 10(B) show a procedure of the processing executed in a second embodiment according to the present invention; and FIG. 11 is a flowchart showing its processing routine. The CPU 620 executes an applications program stored in the main memory 630 to implement the processing of FIG. 11.

In the second embodiment, a video telephone system is realized between computer systems interconnected by a network. The computer system shown in FIG. 1 may also be used in the second embodiment.

At step S11 in the flowchart of FIG. 11, the CPU 620 reads still images from the hard disk drive 654 and writes the still images into a still image area in the second VRAM 310, in order to allow the user to select a person who the user wants to call among the displayed still images. Nine still images used for selecting a person to be called are accordingly displayed in a certain arrangement in a still image area located in the left half of one window as shown in FIG. 10(A).

The program then proceeds to step S12 in the flowchart of FIG. 11, at which a moving picture of the user is displayed in a moving picture area located in the right half of the window. In the structure of the second embodiment, a video camera (not shown) for capturing a moving picture of the user is connected to the video input terminal 103 (see FIG. 2).

When the user selects a person who the user wants to call among the displayed still images at step S13, the CPU 620 starts dialing the selected person via the network interface 656 (see FIG. 1) at step S14. When the line is connected at step S15, a video image of the person on the other side of the line, which is transmitted from a computer system of the person, is displayed in the still image area of the window at step S16 as shown in FIG. 10(B). The video image of the person on the other side of the line is supplied to the CPU 620 via the network interface 656 and transferred to the still image area in the second VRAM 310 by the CPU 620. Since the video image of the person on the other side of the line is intermittently supplied via the network interface 656, the video image is displayed as a semi-continuous still image (in other words, as a semi-moving picture) on the color CRT 701. The video image of the user is also intermittently transmitted to the computer system of the person on the other side of the line via the network interface 656.

While the user is talking over the telephone at step S17, the semi-continuous still image of the person on the other side of the line is displayed in the still image area of the window, and the moving picture of the user is displayed in the moving picture area of the window. When the user hangs up the telephone, the line is disconnected at step S18 and the display in the window is returned to the state of FIG. 10(A).

The second embodiment readily realizes video telephones using computer systems. Not only the semi-continuous still image of the person on the other side of the line but the moving picture of the user can be displayed in one window simultaneously. In the same manner as the first embodiment, the still image and the moving picture in the window can be simultaneously scaled up or down by the same magnification as shown in FIGS. 9(A) through 9(D).

The present invention is not restricted to the above embodiments or applications, but there may be many modifications, changes, and alterations without departing from the scope or spirit of the main characteristics of the present invention. One example of a possible modification is given below.

(1) In the above embodiment, the video signal LSMEM read out from the second VRAM 310 is combined with the video signal LSPC read out from the first VRAM 670 according to the color key data KY registered in the first VRAM 670. It is, however, possible to send the video signal LSPC read out from the second VRAM 310 to the color CRT 701 without being combined with another video signal. In this case, the first VRAM 670 may be omitted from the computer system, and the VRAM 310 has a memory space one-to-one mapped to the display area in the color CRT 701 and thereby works as a frame memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of displaying a moving picture and a still image simultaneously on a display device of a computer system, said method comprising the steps of:

(a) writing background image data representing a background image in a first video memory, said first video memory having a memory space corresponding to a display screen of said display device;

(b) writing key data representing a superimposing area in said first video memory, the superimposing area including a first still image area and a first moving picture area;

(c) writing a still image video signal into a second still image area in a second video memory;

(d) continuously writing a moving picture video signal into a second moving picture area in said second memory, while reading out a first video signal from said second video memory;

(e) scaling up or down a video image represented by the first video signal to produce a second video signal so that a scaled still image and a scaled moving picture image each represented by the second video signal have identical dimensions with the first still image area and the first moving picture area in the first video memory, respectively;

(f) combining the second video signal with a third video signal read out from said first video memory by selecting the second video signal within the superimposing area represented by the key data while selecting the third video signal outside the superimposing area, thereby to produce a fourth video signal; and (g) supplying the fourth video signal to said display device to display a scaled moving picture and a scaled still image superimposed on the background image on the display device.

2. A method in accordance with claim 1, further comprising the step of:

(h) varying a magnification of the scaling in said step (e) and changing the key data stored in said first video memory to scale up or down the superimposing area by the varied magnification.

3. An apparatus for displaying a moving picture and a still image simultaneously on a display device of a computer system, said apparatus comprising:

a first video memory for storing background image data representing a background image, said first video memory having a memory space corresponding to a display screen of said display device;

a second video memory;

key data writing means for writing key data representing a superimposing area into said first video memory, the superimposing area including a first still image area and a first moving picture area;

still image writing means for writing a still image video signal into a second still image area in said second video memory;

reading means for reading out a first video signal from said second video memory while continuously writing a moving picture video signal into a second moving picture area in said second video memory;

scaling means for scaling up or down a video image represented by the first video signal, thereby to produce a second video signal so that a scaled still image and a scaled moving picture image each represented by the second video signal have identical dimensions with the first still image area and the first moving picture area in the first video memory, respectively;

combining means for combining the second video signal with a third video signal read out from said first video memory by selecting the second video signal within the superimposing area represented by the key data while selecting the third video signal outside the superimposed area, thereby to produce a fourth video signal; and means for supplying the fourth video signal to said display device to display a scaled moving picture and a scaled still image superimposed on the background image on the display device.

4. An apparatus in accordance with claim 3, further comprising:

means for varying a magnification of the scaling in said scaling means and changing the key data stored in said first video memory to scale up or down the superimposing area by the varied magnification.

* * * * *